United States Patent [15] 3,699,522
Haner, Jr. [45] Oct. 17, 1972

[54] LOCOMOTIVE RADIO CONTROL SYSTEM WITH ADDRESS AND COMMAND SIGNALS

[72] Inventor: Robert B. Haner, Jr., Scottsville, N.Y.

[73] Assignee: General Signal Corporation, Rochester, N.Y.

[22] Filed: Sept. 20, 1966

[21] Appl. No.: 580,825

[52] U.S. Cl. ..........340/171 R, 340/171 A, 340/163, 325/55, 343/225, 340/146.1
[51] Int. Cl. ..........H04q 11/04
[58] Field of Search ......343/225; 340/163, 171, 161, 340/164, 148, 345, 147, 146.1 C, 171 R; 317/141, 148.5; 325/55

[56] References Cited

UNITED STATES PATENTS

| | | | |
|---|---|---|---|
| 3,403,381 | 9/1968 | Haner | 340/171 |
| 3,355,709 | 11/1967 | Hanus | 340/171 |
| R26,079 | 9/1966 | Cooper | 340/164 |
| 3,069,657 | 12/1962 | Green, Jr. et al. | 343/225 X |
| 3,181,162 | 4/1965 | Cameron | 343/225 |
| 3,359,558 | 12/1967 | Schanbacher | 343/225 |
| 3,440,657 | 4/1969 | Cataldo | 343/225 |

*Primary Examiner*—Thomas B. Habecker
*Assistant Examiner*—William M. Wannisky
*Attorney*—Harold S. Wynn and Milton E. Kleinman

[57] ABSTRACT

A communication system for controlling a remotely located device including a transmitter and receiver for sending and receiving address and command instruction signals with such device. The communication system further includes circuitry for detecting and determining the propriety of the address and command instruction signals. Gating circuitry is provided to conduct proper address and command instruction signals and additional circuitry is provided to produce a predetermined command instruction after improper instruction signals have been continuously received for a predetermined interval of time.

17 Claims, 9 Drawing Figures

INVENTOR.
ROBERT HANER

BY Forrest B. Hitchcock
his ATTORNEY

COMMAND LOGIC MODULE 28

TYPICAL TIMING SEQUENCE FOR SIGNAL FAILURES

INVENTOR.
ROBERT HANER

BY Forest B. Hitchcock
his ATTORNEY

INVENTOR.
ROBERT HANER

BY Forest D. Hitchcock
his ATTORNEY

INVENTOR.
ROBERT HANER

BY Forest B. Hitchcock
his ATTORNEY

LOCOMOTIVE RADIO CONTROL SYSTEM WITH ADDRESS AND COMMAND SIGNALS

BACKGROUND OF THE INVENTION

This invention relates to radio control of locomotives, and more particularly to the checking of transmitted signals and the resultant control of the locomotives dependent upon the integrity of the signals.

In the course of modern industrial development, the utilization of remote control is continually expanding. Amongst the most important uses of remote control is that of supervising the movement of vehicles by the transmission of radio information. This is particularly true in the area of the railroads and related fields such as mining where railroad locomotive units are the main means for the transporting of men and material. Control by radio transmission permits a degree of versatility not obtainable through direct wire communication. It is extremely flexible in the wide range of maneuver control which it offers an operator located at a remote station. The use of radio control, however, is not without problem. If it is desired to operate a number of vehicles within a somewhat confined area as is usually the case, e.g., railroad yards or mining operations, it is essential that the directions transmitted from various stations to a plurality of vehicles do not interfere with one another. This can be provided by utilization of different carrier frequencies for each vehicle to be controlled. However, the number of carrier frequencies made available to a single operation is limited by federal communication restrictions. It must be kept in mind that the airways are public property and a single operation is not allowed to command the use of more channels than definitely necessary for its purpose.

Another method and the one which is currently used in the system to be described, is where a single carrier frequency is used but the control signals modulated onto the carrier are transmitted in a randomly spaced pattern of pulses. That is, a non-synchronous multiplex system is used wherein a number of vehicles are controlled by information imposed on the same carrier frequency but which do not interfere with one another due to the use of randomly spaced transmission and specific vehicle address coding. Address coding and random transmission permits the handling of an extremely large number of vehicles without producing substantial interference between the different information transmissions. Unavoidably, however, there are a certain number of interferences which must take place particularly as the number of vehicles to be controlled grows larger. There is no way to completely isolate the transmission of information to one vehicle from that of another and the possibility of blanking or interference does exist for a very limited amount of time. This interference or blanking of pulses would produce in the vehicles being operated incorrect commands resulting in either emergency stops or hazardous operation. To obviate this circumstance, various system measures are taken. In a system described in a co-pending application, Ser. No. 270,751, inventor Hughson, a system is disclosed wherein the integrity of the address and command signals is checked and then applied to an AND gate. The output of the AND gate, when receiving proper address and command signals, in turn controls a command signal gate the closing of which permits the command signals to activate application relays. Receipt of improper signals immediately shuts off the AND gate which allows the system to operate on its last received signal. Failure of output from the AND gate also activates another safety circuit which shuts the system off causing an emergency stop if a proper address or command signal is not received through the AND gate for a continuous 5 second period. There is, however, the possibility, since relays are electronic switching devices require a finite time to change position, that an interfering pulse received from a station not intended to control the vehicle under consideration, will go through the command signal gate before the failure of output from the AND gate can shut the command signal gate off. Such occurrence results in the imposing on the application relays of an improper command. To prevent this occurrence, a later co-pending application, Ser. No. 430,673 now U.S. Pat. No. 3,403,381, granted July 24, 1968 of this inventor, describes a system wherein the information coding is delayed for ten milliseconds after the address coding is applied. This permits the deenergization of the command signal gate or in this particular invention an AND relay prior to application of commands to the application relays. Additionally this latter application provides for bypassing the AND gate by the command signals, allowing for immediate application of garbled or improper code signals to the application relays and due to the established logic of these relays results in an immediate emergency stop of the vehicle.

The Hughson application under all conditions of improper signals must go through a 5 second period before a stop indication is imposed, the later Haner application avoids the hazards introduced by a 5 second period operation of the vehicle and instigates an emergency stop immediately upon receipt of an illegitimate command signal. This mode of operation, however, introduces another problem involved with normal system use. In a pulsed command signal system such as under discussion, it is feasible that upwards of 96,000 command pulses may be received within a 24 hour period. Obviously, even the smallest realistically obtainable percentage of error in transmission of information results in an intolerable and unwarranted number of stops.

The present invention of this application is directed to avoiding the occurrence of numerous emergency stops upon the receipt of single faulty transmission, as well as the negating of the hazards introduced by an overall 5 second stop period.

Since it is probable that during any particular period of transmission a single information signal may be garbled by either an adjacent operator or some other outside influence, this invention provides a logic circuit which senses the fault and immediately shuts off an AND gate thereby opening an AND relay. The last received correct signal is then used to control the system. If this were all that were added, the anomalous situation would rise where the last received signal is controlling the vehicle but the operator is unable to introduce a new signal for the 5 second period at which time a shutdown would occur, thus once again introducing the hazards of a 5 second interval before automatic stop. Further, if a failure also occurred in the 5 second period control function unit, then operation on the last received signal would continue for an indefinite period until the circuit time constants cause shut down or the operator realizes the difficulties present and shuts the system down completely. So while the addition of this logic circuitry prevents the emergency shutdowns occurring on a frequent basis due to the receipt of single garbled information pulses, it would still present a hazard of continuing 5 second operation. A timing circuit is therefore added to the logic circuitry to correct this situation. If a pulse containing correct command signals is absent for longer than a period of 1.5 seconds, the logic circuitry output signal is switched out and allows the AND gate to again produce an output signal energizing the AND relay. This results in the re-application of the command signals to the application relays. If at this juncture the command signals are still improper, the application relay logic will result in an emergency shutdown. Time for this shutdown will employ an interval no greater than 3 seconds from the receipt of the first improper command. However, if the command signals received on the next incoming pulse are correct, then the system will proceed operating in normal function. The use of the 1.5 second timing period greatly increases the probability that no system shutdown or emergency stop will occur; for while the percentage error in transmission of a single pulse is relatively small, the probability of a double pulse transmission of incorrect information approaches zero. The normal 5 second period stop timing is still provided upon failure of the address information. A pulse ON pulse OFF network senses the output of the AND gate and if such output is absent for greater than 5 seconds, the system goes to emergency shutoff. The small probability of a continuous failure in address makes the hazard presented by a 5 second shutdown negligible with respect to normal operating conditions.

It is therefore an object of this invention to provide an improved system for controlling remotely located devices.

A further object is to provide logic circuitry determining the integrity of received command signals.

It is a further object to provide logic circuitry determining the integrity of received signals with a timing circuit actuated upon failure to receive a proper signal within a predetermined time.

Another object of this invention is to provide logic circuitry with transistor and solid state diode switching.

Another object is to provide a system for continuing operation of the system on a last received signal upon the transmission of incorrect control information.

Another object of the invention is to provide circuitry for shutting down the system to emergency stop after the receipt of continuing incorrect information pulses.

Still another object of the invention is to prevent numerous emergency stops upon the receiving of single improper pulses of command signals.

Another object of this invention is to provide a system wherein a five second stop period results upon the failure of transmitting proper address information.

SUMMARY OF INVENTION

Briefly, a description of the invention is presented. Randomly, time spaced radio pulses of information are transmitted and picked up by a receiving unit. This information contains address signals signifying the vehicle to be controlled and command signals whereby the actions of the vehicle are established. The signals are detected and used to control switching and application relays as well as logic circuitry. More specifically, the address signals are applied through associated circuitry to an AND relay driver. The AND relay driver is a conventional AND gate circuit. The command signals, as detected, are conducted through a buffer amplifier to an AND relay controlled by the same AND gate and also to a command logic module. The output of the command logic module is conducted to the AND gate or AND relay driver. The output generated by the AND relay driver is thusly dependent upon receipt of proper address and command signals. If incorrect address signals are received, the AND relay driver logic is not satisfied and its opening will be sensed by a pulse ON pulse OFF sensing network. The pulse ON pulse oFF networks result in the shutting down of the system to emergency stop if a correct address pulse is not received for a total 5 second period of continuous operation. At the same time failure of the AND relay driver output results in deenergization of the AND relay. Opening of the AND relay prevents any new command information from being transmitted to the application relays and results in the system continuing to operate during the 5 second period on the last received signal, this established by the time constant of the command relay drivers.

Now, assuming that a correct address signal is received by the radio receiver unit, the AND relay will receive correct address signals as detected and the pulse ON pulse OFF safety network will allow the application relays to continue in normal operation. If at the same time correct command signals are received, EXCLUSIVE OR circuitry of the command logic module will sense this and conduct the desired output signal to the AND relay driver. The AND relay will then be energized and output signals from the buffer amplifier will result in energizing the application relays producing desired vehicle operations. However, if due to some either extrinsic or intrinsic fault in transmission, an improper command signal is detected, the EXCLUSIVE OR circuitry of the command logic will reject the improper command signal and result in an improper signal being conducted to the AND relay driver closing its output and resultant deenergization of the AND relay. Relay deenergization again causes the system to operate off its last received control signal.

A timing circuit forming an integral part of the command logic module at the same instant senses the change of output from the EXCLUSIVE OR circuit of the command logic module. If such changed output continues for a period greater than 1.5 seconds a relay in the command logic module deactivates, and allows a correct or desired signal to appear on the AND relay driver. The AND relay driver once more energizes the AND relay and any new command logic signals are transmitted through to the application relays. When the next signal is received, which can vary up to an additional 1.5 seconds, it is correct, the control system will function in a normal fashion and the command logic module will return to its normal state. However, if the command detector output is still improper, then the transmission of faulty or illogical direction to the application relays will result in emergency stop, necessitated by the logic established in the application relay switching. Thus, a failure of one or two pulses to contain proper command information may not result in immediate system shutdown; continuing failure for a period greater than 1.5 seconds will result in system shutdown depending on the integrity of the next received signal. The invention presents an aspect of system behavior where the hazards of continuing operation under a last received signal is minimized while at the same time the intolerability of numerous system emergency stops is obviated.

A greater understanding of the scope of the invention and incisive analysis of its specific details of operation and structure will be permitted by the following descriptive matter read in conjunction with the various drawings.

DESCRIPTION OF THE PREFERRED EMBODIMENT

Figures 1A, 1B:
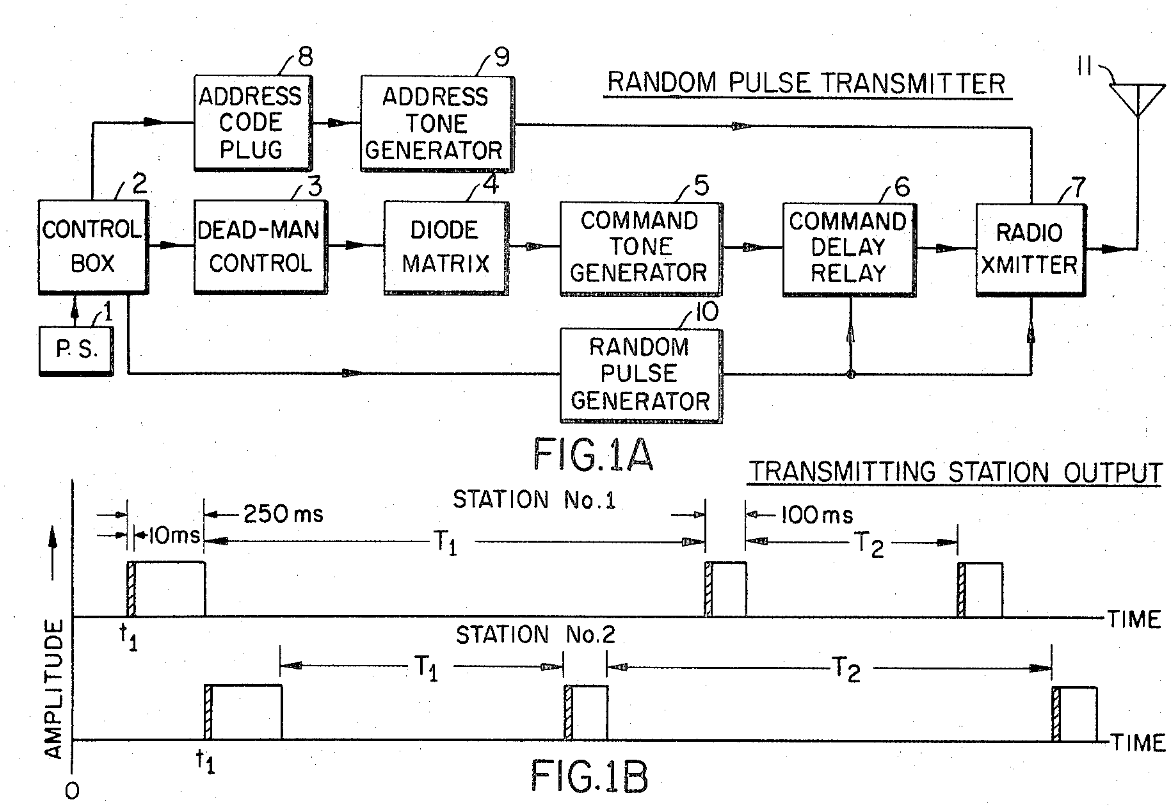
FIG. 1A a block diagram of a typical transmitting system.
FIG. 1B a graphical presentation of typical transmitted information pulses.

The functional block diagram of FIG. 1A shows a transmitter 7, preferably of the FM type so as to avoid noise and signal garbling introduced by amplitude variations, which drives an antenna 11 for transmitting to the various vehicles to be controlled. The radio transmitter 7 is driven from a command delay relay 6; a command generator 5; a diode matrix 4; a dead-man control 3; and a control box 2. The control box 2 establishes the information to be transmitted. A random pulse generator 10 connecting from the control box 2 provides an input to both the command delay relay 6 and the radio transmitter 7. In addition, an address code plug 8 and an address tone generator 9 is connected between the control box 2 and the radio transmitter 7. A power supply 1 connects to the control box. All of the above outlined equipment is portable and carried on the person of the operator in such manner as to leave the operator's hands free for related work. The equipment utilizes solid state components for reliability, compactness, lightweight and power economy. Operationally, the transmission system may be considered as to have two information channels which are mixed in the radio transmitter 7 and sent through space via the antenna 11. Both channels are controlled by the control box 2. The system power is provided by the power supply 1 which consists of rechargeable batteries. The control box 2 contains push buttons and switches used for selecting of the various commands to be transmitted. The address code plug 8 upon receipt of a directive from the control box 2 establishes a number of frequency tones distinctive of a particular vehicle by acting on the address tone generator 9. The code plug 8 establishes a definite tone combination for each vehicle and thus adapts otherwise standard equipment to a particular operator-vehicle combination. The address tone generator 9 consists of a number of tone generating inductive capacitive networks. A singular frequency tone is provided for each ON and each OFF condition or one and zero of a particular digit.

The digit transmitted is determined by the input of the address code plug 8. A group of digits identifying a particular vehicle will therefore consist of a series of tones generated by the address tone generator 9. At all times only a single tone for each generator can be transmitted. If more than a single tone or no tone is transmitted for a digit, it is indicative of system malfunction. The output of the address tone generator 9 is conducted to the radio transmitter 7 where it modulates the transmission carrier frequency.

The command controls established by the control box 2 are firstly conducted to a dead-man control 3. The dead-man control 3 consists of mercury type switches which open should the operator's body position vary beyond a predetermined limit from the normal upright position. From this point, they are conducted to a diode matrix 4. The diode matrix interprets the various outputs from the control box and selects specific tones to satisfy the desired code for each operation command. The command tone generator 5, similar to the address tone generator 9, consists of specific inductive-capacitive networks for generating tones of a particular frequency indicating the zero or one condition of a command digit. A number of these tones or pairs of tones are provided so as to form a command word. Again, the presence of more than one single tone frequency for a particular digit indicates a malfunction, as also is the case when no tone frequency exists. The command type generator 5 also contains circuitry for initiating a new pulse immediately upon the receipt of a change in command. The output of this command tone generator 5 which consists of various tone frequencies characteristic of a particular command word is transmitted to the command delay relay 6. The command delay relay 6 provides a 10 millisecond delay for the command signals with respect to the address signals. That is, the modulation of the carrier frequency with the tone signals containing address instructions will take place and be transmitted to the receiving equipment 10 milliseconds earlier than that of the information digits containing command instructions. The output of this command delay relay 6 is conducted to the radio transmitter 7 where in like manner to the address tone signals it modulates the carrier frequency in predetermined time relationship to the address tones. The random pulse generator 10 provides pulses of approximately 100 milliseconds duration. At the same time, it varies the repetition rate of these pulses from a minimum of 0.5 seconds to a maximum of 1.5 seconds. The variation of this interval can be accomplished in a number of ways all equally satisfactory. The one used in this particular system comprises two conventional freerunning multivibrators. One multivibrator generates a pulse approximately ever 1.5 seconds and the other a pulse approximately every 2.0 seconds. The pulses from these two multivibrators thus form a repetitive pattern with varying time spacing. When a new command is initiated, the trigger pulse from the command tone generator 5 immediately actuates an information pulse and causes it to last for 250 millisecond duration. The first pulse of a new command is therefore longer than those following and is always transmitted immediately. The output of the random pulse generator is fed to both the command delay relay 6 and the radio transmitter 7 so as to establish the outlined transmission functions and characteristics. The radio transmitter 7 is transistorized and broadcasts at 154 megacycles at a power level of approximately 200 milliwatts. The oscillator and modulator run continuously and all multiplier and amplifier stages are keyed by the random pulse generator;

that is, upon receipt of the random pulses from the random pulse generator 10 the tone signals containing address and command information are imposed upon the carrier and transmitted to the remotely located receiving equipment. A typical pulse transmission pattern for two transmitting stations is shown in FIG. 1B.

A detailed analysis of the information generating and transmitting equipment is not germane to an understanding and analysis of the present invention and no further description or specific details will be outlined for this part of the equipment.

A broad functional description and understanding of the transmitting equipment is satisfactory to an understanding of the present invention.

Figure 1C:
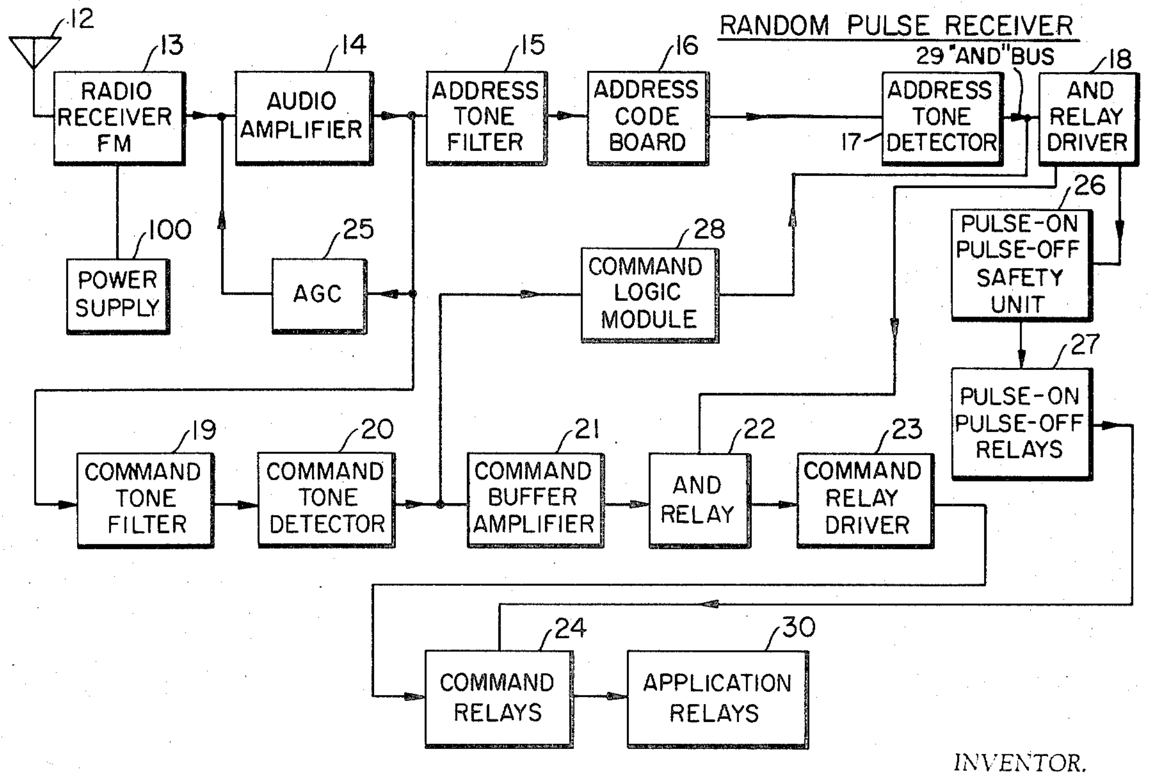
FIG. 1C a block diagram of a typical receiving system.

FIG. 1C shows the functional arrangement of the vehicle signal receiving equipment. This equipment is all structurally mounted to the moving vehicle. It comprises an FM receiving antenna 12, a radio receiver 13 for detecting the signals received by the antenna 12, an audio amplifier 14 with automatic gain control 25 and two distinct equipment channels responsive to the output of the audio amplifier 14. One channel containing equipment for detection of the address tones; viz., an address tone filter 15, an address code board 16, and an address tone detector 17. The other containing equipment associated with the command signals namely a command tone filter 19, command tone detector 20, a command buffer amplifier 21 and a command logic module 28. The command logic module 28 and the address detector 17 connect to an AND relay driver 18, which in turn connects to an AND relay 22 and a pulse ON-pulse OFF safety network 26. The pulse ON-pulse OFF safety network 26 is conducted to the pulse ON-pulse OFF relays 27 and ultimately to the command relays 24. The buffer amplifier 21 is also conducted to the AND relay 22 and when this relay is energized to a command relay driver 23 and thence to the command relays 24. The application relays 30 are responsively connected to the command relay 24 for controlling vehicle operating equipment. A power supply 100 using rechargeable batteries is used to energize the equipment and makes available voltages of −20, −10 and 0 or (+).

Operationally, the receiving equipment containing the applicant's invention will be analyzed on the basis of its operation for a single transmitted digit. All digit channels comprising a control or command word or address operate in the same manner and it would not only be redundant but confusing to an understanding of system characteristics to attempt an operational description on the oasis of more than one received address and command digit. It is however, to be fully understood that both the address and the command signals comprise a plurality of the digits analyzed.

The radio receiver 13 senses or picks up the signal transmitted by the portable control equipment. The receiver 13 output is a combination of audio frequency tones and may be likened to a chord, i.e., a signal consisting of a plurality of discrete tones. Any number of tones may be received depending upon the capability and the versatility required of the transmitting equipment. In that it is portable, a definite limit on the number is established. The particular system disclosed utilizes five address and four command tones but is capable of supplying greater numbers if needed. It is to be kept in mind that each tone represents a particular state of a digit, that its opposite state is represented by another tone and therefore, that each digit must consist of only one of two possible transmittable tones. The receiver output is fed to the audio amplifier 14, which amplifies the tones before they are fed to the tone filters 15 and 19 for the address and command tones respectively. A portion of the audio output is also fed to the automatic gain control 25, hereinafter referred to as AGC, which keeps the output of the audio amplifier 14 constant by varying the output resistance of the radio receiver 13 thus establishing a regulating network for the radio receiver. The tone filters, both command 19 and address 15, pass only those tones that agree with the specific resonant frequencies of their tuned circuits. Both have conventional band-pass filters combined with a transistor voltage amplifier providing proper operating levels. Each is also followed or consists of an emitter follower transistor circuit providing low impedance output to drive associated detectors. The output of the address filter 15 consisting of a number of tones corresponding to the desired vehicle is conducted or received by the address code board 16. The connections made on the address board 16 determine which frequency tone should be present and which frequency tone absent in each frequency or digit channel to make up the desired address word. This address board 16 in its arrangement establishes the same code as that established by its commensurate address code plug 8 located in the transmitting equipment. The wiring is arranged so that a desired tone is a yes or one and the undesired a no or zero. A proper address signal comprises all yes tones; in other words, if the correct zero or one signal tone is received by the address board, it will present on output aspect consisting of all the "yes" and none of the no tones. The outputs of the address code board 16 and the command tone filter 19 are fed to the address tone detector 17 and command tone detector 20 respectively. The address and command tone detectors 17 and 20 are similar, if not exactly the same in design, each depending upon the tones received produces a particular desired signal out.

If the address tone detector 17 receives the preselected frequency tone as established by the address board 16, it produces a positive-going output. Should it receive a tone of undesired frequency or not receive a tone of desired frequency, it produces a negative output. The command tone detector 20, inherently not being adaptable to fixed programming in a manner similar to the address tone detector 17, must be capable of receiving signals of either tone variety for a particular digit depending upon the desired command to be exerted. The circuitry of the command tone detector 20 consists of a separate channel for each possible tone and is arranged so as to produce a negative 20 volt signal upon absence of a particular tone, on the channel connected with that tone, and a signal of approximately zero when such tone is received. A proper signal output from each of the detector channels consists of either zero or approximately −20 volts. Production of output voltages varying considerably from either of these magnitudes indicates a probable malfunction producing an illogical and impossible command to the system. System parameters are chosen so that a small variance from these figures is still acceptable.

Figure 2:
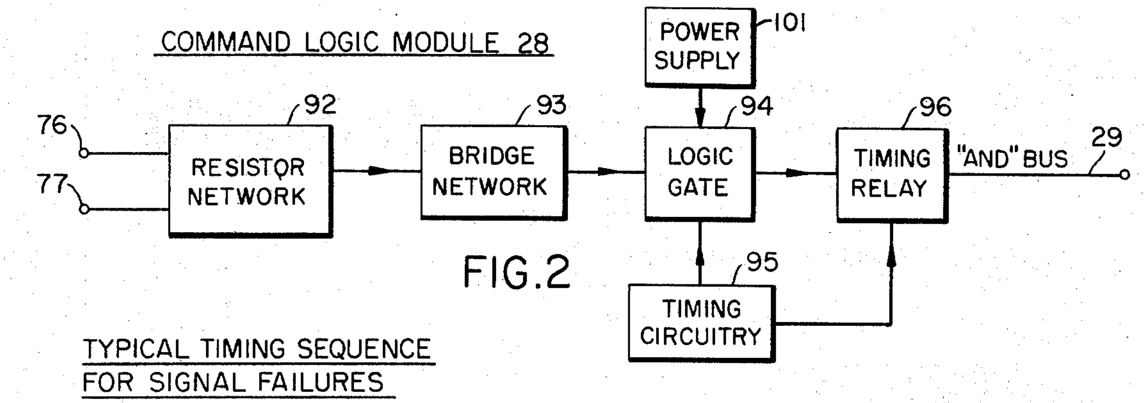
FIG. 2 a block diagram of the logic module.

The output of the command tone detector 20 is then received by a buffer amplifier 21 and a command logic module 28. The buffer amplifier 28 provides necessary output impedance to drive ensuing circuitry later to be described. The logic module 28 comprises (see FIG. 2) resistor network 92, bridge networks 93, logic gate 94, timing circuitry 95, timing relay 96 and power supply 101. Functionally, upon the receipt of signals from the command tone detector 20 for each command digit, it senses the propriety of the command received and depending upon its decision controls the gating of the control and application circuitry. The legitimacy of the received signal is determined upon its application to resistor network 92 and bridge network 93 which resistively mixes the outputs associated with each command digit and accepts only the signal associated with a one or zero condition, i.e., only one of the two possible frequencies associated with the command digit being transmitted. Remembering that the absence of a command digit is represented by −20 volts while the presence of a command digit is represented by zero volts, the signal obtained from the resistor network 92 from a proper command is represented by −10 volts, the failure to detect any tones is represented by −20 volts, and the receipt of two tones by 0 volts. At any time an improper command signal is sensed by the resistor network 92 the output of the bridge network 93 turns on the logic gate 94 and the output of the command logic module 28 goes to −20 volts. At the same instant the time constant of the timing circuitry 95 commences running and ultimately deenergizes the timing relay 96 if improper command signals are continually received.

The output of the command logic module 28 in conjunction with the output of the address tone detector 17 are both conducted to the AND bus 29 and thence to the AND relay driver 18. The AND relay driver 18 is a conventional AND gate. All inputs received from the address detector 17 and the command logic module 28 must be of positive potential character, i.e., 0 volts as opposed to −20 volts. When this is achieved, the AND relay driver 18 closes. If, however, as in the case when an improper command signal is received or the address tone detector 17 fails to receive all desired yes tones, a negative voltage is applied to the AND relay driver 18 and it results in its immediate shutdown. The AND relay driver 18, as its main system function, controls the energization of the AND relay 22, energizing it upon receipt of proper input signals while deenergizing it upon failure of proper signals being received from the command logic module 28 or the address tone detector 17.

The command signals, as established by the command tone detector 20 and the command buffer amplifier 21, are connected through the AND relay 22, when energized, to the command relay driver 23. The production of improper or negative signals from the command logic module 28 clamps the AND bus 29 to a negative value and the AND relay driver 18 to an off position thus opening the AND relay 22, and as is apparent no new signal can be conducted from the command detector 20 through to the command relay driver 23. The vehicle must continue to operate for this period on its last received signal which is held by the time constant associated with the command relay driver 23. To limit this type of a situation where no new signal can be imposed upon the vehicle, the command logic module is supplied with the aforementioned timing circuitry 95.

The timing circuitry 95 consists of transistor switches and an RC timing or integrator circuit. It is sensitive or responsive to the receipt of pulses from the AND bus 29. As each pulse of signal is received, it is applied through transistor circuitry to the RC combination. Upon failure of such pulse as is the case when an incorrect command signal is derived, thereby clamping the AND bus 29, the RC combination commences to discharge. If the absence of pulse continues for more than approximately 1.5 seconds, it results in deenergization of timing relay 96. This relay disconnects the logic gate output from the AND bus 29 and permits it to once again achieve a positive-going potential; thus allowing the AND relay driver 18 to turn on and energize the AND relay 22. Energization of the AND relay 22, as described, permits new command signals to be conducted to the command relay driver 23 for supervision of vehicle operation. Upon the conducting of new signals through the AND gate 22, the system will react in one of two ways. If the new signals still contain illogical command tones, such will be sensed by the logic of the application relays 27 and result in application of emergency stop, this action dependent upon the time interval between closing of the AND relay 22 and the next received pulse, can occur no later than 1.5 seconds after closing of the AND relay 22 or a total elapsed time between an incorrect command and stop of no greater than 3 seconds. Should the next pulse contain proper commands, then application relays 27 30 will exert control over vehicle movement and the command logic module 28 will return to its normal functional mode.

In addition to controlling the operation of the AND relay 22, the output of the AND relay driver gate 18 is also applied to a pulse ON-pulse OFF safety network 26. This network is arranged so as to provide from a transistor switching network, energization to a pulse ON relay contained in the safety pulse ON-pulse OFF relay unit 27, as long as positive-going pulses are received at an interval of less than 5 seconds. At the same time, energization is prevented, by the pulse OFF network, from being applied to the pulse OFF relay contained in the pulse ON-pulse OFF relay unit 27, as long as, once again, positive-going pulses are received no further than 5 seconds apart. The result is that the command relays 24 are held in positions adaptable to the receiving of command signals from the command relay driver 23 as long as the pulse ON-pulse OFF relays 27 remain closed. If there is failure to receive correct address pulses for a period of greater than 5 seconds, the pulse ON-pulse OFF safety network 27 will result in dropping the command relays 24 to an emergency stop position.

Review of the broad operational analysis as presented, at this juncture indicates that the invention of the applicant is concerned mainly with circuitry providing for two separate shutdown times associated with signal failures; viz., a 1.5 to 3 second shutdown dependent upon the receipt of faulty command signals and a 5 second interval shutdown upon the failure to receive proper address signals.

Figure 4A:
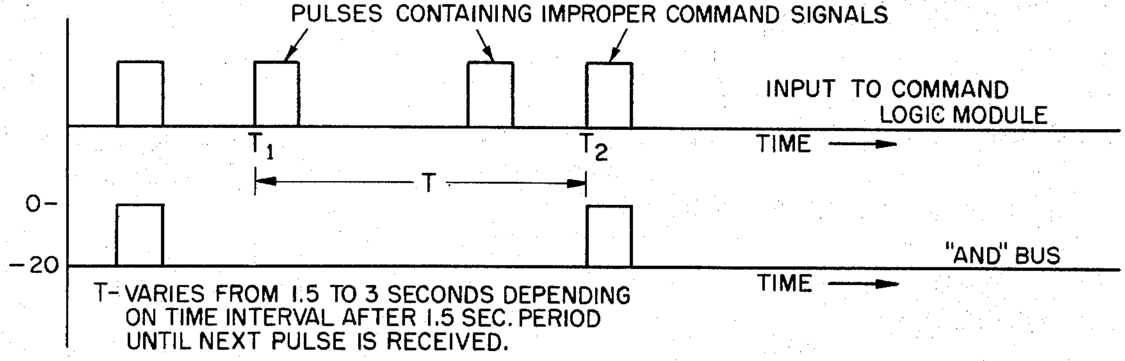
Figure 4B:
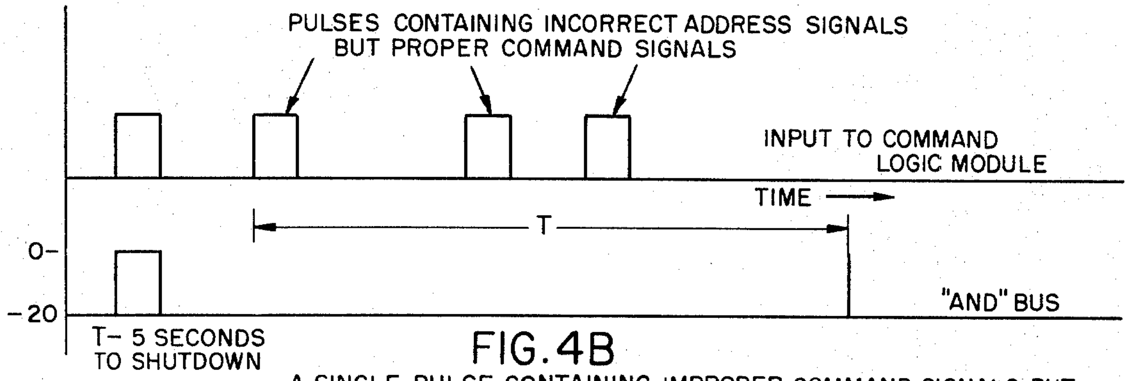
Figure 4C:
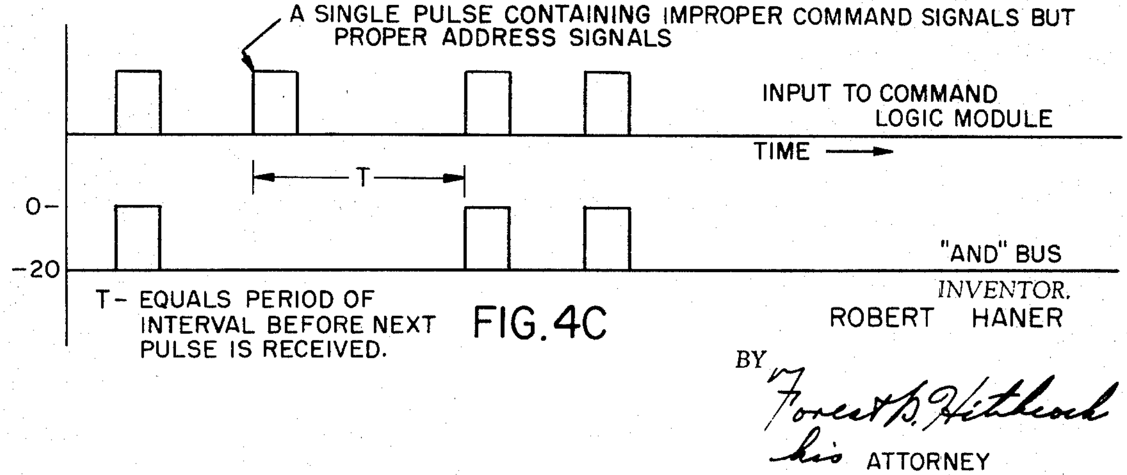

FIGS. 4A through 4C demonstrate the possible mode and periods of shutdown; the presence of −20 volts on the AND bus 29 indicates receipt of a faulty signal. FIG. 4A shows a typical shutdown resulting from a continuous absence of correct or proper command information; FIG. 4B shows a stop imposed after a 5 second interval by the pulse ON-pulse OFF safety network 26 upon a continuous absence of proper address signals and finally FIG. 4C presents the condition where an incorrect command is sensed but the system goes back to normal operation upon receipt of the next succeeding pulse which contains proper commands. To allow for a fuller understanding of the specific embodiment of this invention a detailed analysis of the command logic module 28 and the circuitry associated with this operation will now be presented.

Figure 3A:
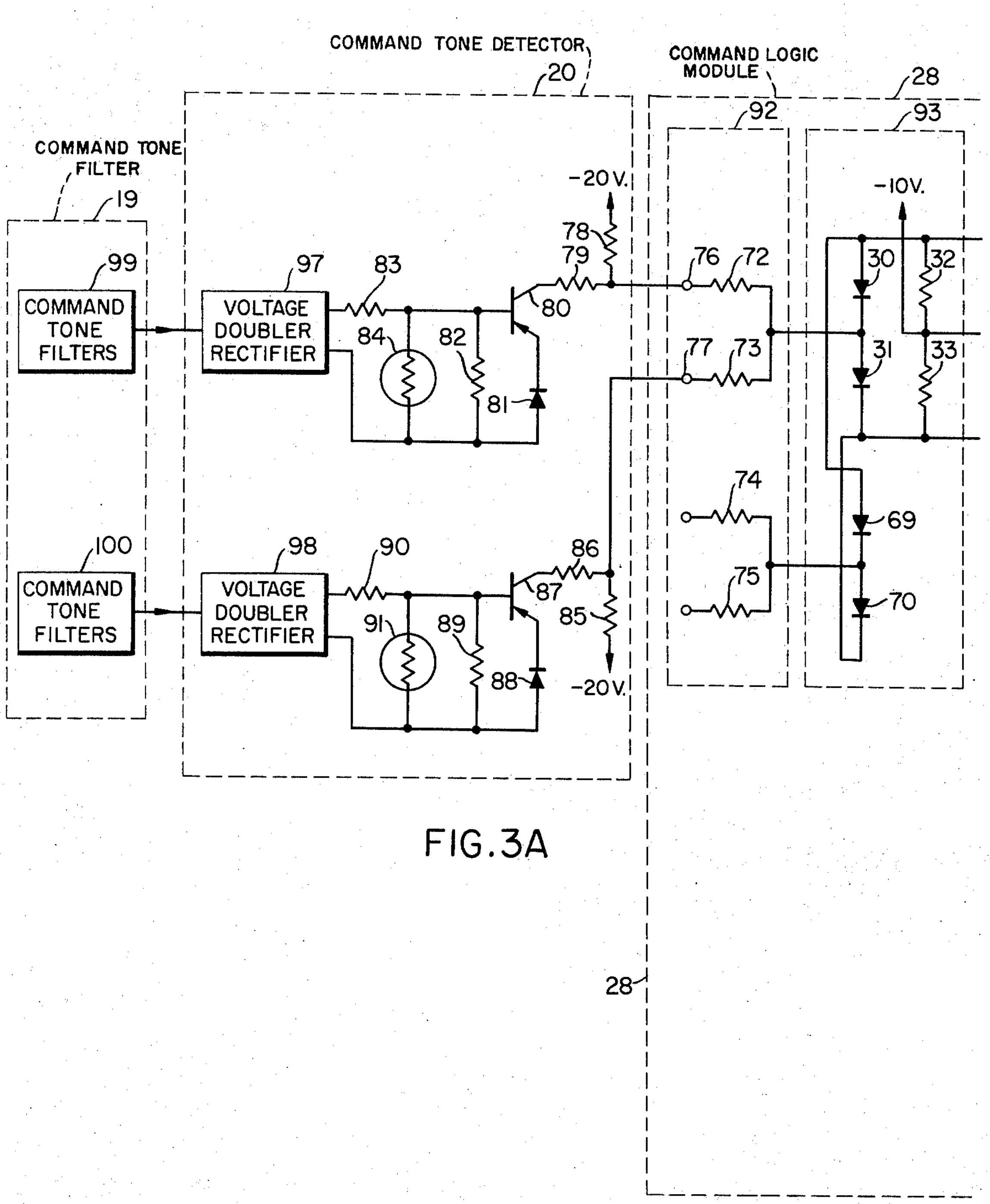
FIGS. 3A and B a schematic of the logic module switching and timing circuits, and FIGS. 4A, B and C a graphical presentation of the timing sequence for various signal failures.
Figure 3B:
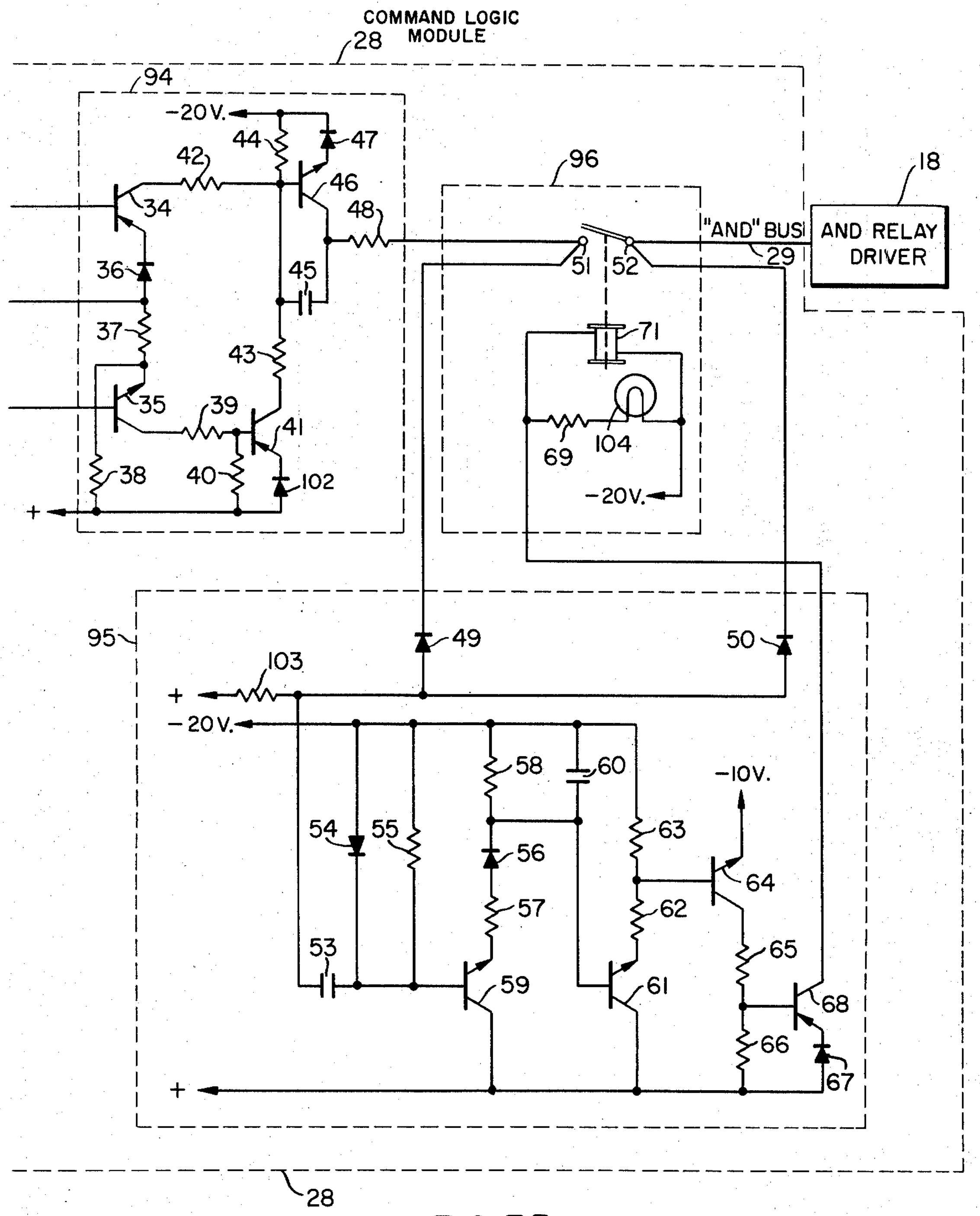

Referring to FIGS. 3A and B and considering for example a particular command digit, a singular tone frequency is received from the output of the command tone detector 20. The tone representing either a one or zero command digit depending upon the selected frequency. The tone output is transmitted or conducted to a particular detector associated with that digital channel and tone. The detectors for either state of command signal; i.e., one or zero are exactly the same. As FIG. 3A shows a typical tone signal is received from the command tone filter 99 which after rectification by the voltage doubler circuit 97 is conducted to resistor 83 which in conjunction with resistor 82 forms a base biasing network for transistor 80 a PNP type. A thermistor 84 is connected in parallel across bias resistor 82 so as to provide thermal compensation. As the signal from the rectification circuit is received it is negative in polarity. When this negative signal magnitude exceeds a definite predetermined value, the transistor 80 becomes conductive. Resistors 79 and 78 form the collector load for transistor 80 and the signal to be derived from the command detectors is picked from the junction of resistors 79 and 78, as can be easily seen from the circuit, when no signal is derived from the command tone filter 99, transistor 80 is shut off and the output signal approximates the collector voltage, which in this instance is −20 volts. However, when a signal is derived and transistor 80 turns on, the signal at the junction of resistors 78 and 79 drops to approximately zero. Thus, presence of a tone is indicated by a signal of approximately 0 volts and absence of a tone is indicated by a signal of approximately −20 volts. A diode 81 is contained in the emitter circuitry of transistor 80 so as to limit leakage current by providing reverse biasing. A second detector circuit consisting of resistors 90 and 89 forming the base biasing network and thermistor 91 for thermal compensation, transistor 87, collector load resistors 86 and 85, and emitter diode 88 is responsive to the other alternative tone signal generated by command through filter 100 and voltage doubler 98. Dependent upon the character of the command to be transmitted to the vehicle, the signals derived from the junctions of resistors 78 and 79 and 85 and 86 respectively are then conducted to the buffer amplifier 21 for eventual transmission through the AND relay 22 to the command relay driver 23 and command and application relays 24 and 30. The same outputs are also conducted to the command logic module 28. Again, to be specific, the signal derived from the junction of resistors 78 and 79 is conducted through to terminal 76 while that derived from junction of resistors 85 and 86 is transmitted through to terminal 77. Both these terminals connect to resistors of the same value; viz., resistors 72 and 73, which are connected in series. If a proper tone signal is being derived on one of the two terminals 76 and 77, while no terminal signal is on the other, a −10 volts will result as a signal present at the junction of resistors 72 and 73. Typically, resistors 74 and 75 form a resistive pair available for other possible tone command signals. The voltage at the junction of resistors 72 and 73 is conducted to a bridge network 93. The bridge network 93 comprises diodes 30 and 31 connected in series and resistors 32 and 33 connected in series and in parallel with the diodes. The signal is conducted to the junction of diodes 30 and 31. A −10 volt signal derived from the power supply is at the same time connected to the junction of resistors 32 and 33. Thus, the voltage derived across the junctions of the diodes and the resistors will in the case of proper command signals being received be zero, if an improper signal, wherein the voltage magnitude established at the junction of the resistor mixing parts may be either 0 or −20, then either a − 10 or +10 volt bridge output will be established. Inspection of the schematic also shows another diode pair; viz., 69 and 70 connected in parallel across the two previous mentioned diodes, the junction of which connects to the resistor pair comprising 74 and 75. It can be seen that any improper signal derived from a separate digit command will introduce a change in bridge output to either of the previous mentioned −10 or +10 volt state. The bridge output voltage in turn controls the conductance state of transistors 34 and 35 FIG. 3B. If the signal output of the resistor pair indicates the absence of any tone command signals, the bridge output will attain a +10 volt magnitude. This magnitude voltage causes transistor 35 to be turned on by application of the voltage to its base. The change in state from off to on for transistor 35 establishes a negative-going voltage on the base of transistor 41. This voltage is determined by the collector-resistor network for transistor 35; viz., resistors 39 and 40. These same resistors form the base bias network for transistor 41. Resistors 37 and 38 form an emitter biasing circuit for transistor 35 which establishes its off and on change point. A diode 102 in the emitter circuit of transistor 41 is used to establish a reverse bias thereby limiting leakage current through the transistor. The collector resistor 43 for transistor 41 forms a part of a bias network for another transistor 46. The second half of this bias network consists of resistor 44. As transistor 41 turns on, the voltage established by the bias network becomes less negative or in other words a positive-going signal. The positive-going signal permits transistor 46 an NPN type to become conductive at a predetermined level. A diode 47 is present in the emitter circuit of transistor 46 so as to establish a reverse biasing and limit leakage current. A capacitor 45 is connected between resistor 43, forming the load resistor for the collector of transistor 41 and part of the bias network for transistor 46, and resistor 48, the collector resistor for transistor 46. The presence of this capacitor prevents the conducting of voltage, which in this case would be a minus voltage, to the output of the logic module circuitry which is in turn connected to the AND bus 29 of the AND relay driver 18. The capacitor 45 also slows down transistor 46 preventing transistor reaction to noise which may be present in the transistor circuitry. When transistor 46 becomes conducting, it connects the output of the AND bus 29 through contacts 52 and 51 of relay 71 to the −20 volt supply. The AND relay driver 18 is then opened and results in deenergization of the AND relay 22 and cutting off of commands to the command relay driver 23. The system is then placed in a mode where the vehicle operation is determined by the last received signal.

Now considering the case where a tone signal is received from both detectors at the same time thus producing a −20 volt output from the resistor pair 72 and 73, the bridge output goes to a −10 volts. A minus signal will not turn on transistor 35 which is of the NPN type, but will cause transistor 34 to become conductive. The output of the bridge is conducted to the base of transistor 34 thus determining its conducting state. A diode 36 is contained in the emitter of transistor 34 providing a reverse biasing and a limiting of leakage current. The collector circuitry consists of resistors 44 and 42 which resistors also form a bias network for transistor 46. When transistor 34 is conducting, the voltage present on the junction of resistors 44 and 42 becomes a positive-going voltage. This similarly to the case or the instance when transistor 41 becomes conducting causes transistor 46 to be turned on. Again, when transistor 46 is turned on, a −20 volts is applied to the AND bus of the AND relay driver 18 thereby deenergizing the AND relay 22 and resulting in an operation dependent upon the last received command signal. Thus, at this point it is evident that the "Exclusive Or" command logic circuitry comprising resistor networks 92, bridge network 93 and logic gate 94 senses any failure present in the command signals and immediately causes the AND relay 22 to open thus preventing transmission of faulty signals to the application relays 30.

As described previously in the general description of the operation of this invention, if some means for bypassing the logic switching after a defined period were not provided, the circuit would then remain in its present state unless a new command signal of legitimate information is received or the operator realizes the lockup present in the system and shuts the system down to emergency stop. This potential problem is obviated by timing circuitry 95 present in the command logic module 28. In normal operating mode, i.e., when the command signal being received by the logic switching circuitry is correct, a resistor 103 connecting between the (+) common and the AND bus 29 generates a series of positive-going pulses. These pulses are applied through a capacitor 53, forming a differentiating circuit, to the base of transistor 59. A resistor 55 connecting between the −20 volt supply and the base of transistor 59 establishes the operating point or switching point for transistor 59. A diode 54 again connecting between the −20 volt supply and the transistor 59 short-circuits the negative pulses derived from the differentiating capacitor 53 upon the ceasing of the pulse input. When transistor 59 turns on due to the incoming positive pulse, it being an NPN type transistor, it proceeds to charge through emitter resistor 57 and emitter diode 56, a second capacitor 60. Due to the low impedance condition of the transistor in its conducting state and the low value of impedance present in its emitter circuit, a very fast charge cycle is established for capacitor 60.

During the absence of a received pulse, transistor 59 shuts off. At this point the capacitor is left to discharge through a parallel resistor 58 of relatively high value and through the base of another transistor 61, thereby establishing a long discharge time constant, the transistor being an NPN type. When the voltage across the capacitor reaches a predetermined value, it forces the transistor 61 into a conducting state. Resistors 62 and 63 present in the emitter circuit of transistor 61 forms a bias network for transistor 64 and applies from their junction a positive-going pulse or signal to transistor 64 whenever transistor 61 is conducting. This, in turn, establishes a conducting state for transistor 64. Present in the collector circuitry of transistor 64 is another resistor pair consisting of resistors 66 and 65. The junction of these resistors is conducted to the base of transistor 68, a PNP type. As transistor 64 becomes conducting, the voltage at the junction of these resistors or the base of transistor 68 becomes a negative-going voltage and results in transistor 68 being turned on. A diode 67 is present in the emitter circuitry of transistor 68 to provide reverse biasing and thereby limit leakage current. The collector circuitry of transistor 68 contains the coil of relay 71 and in parallel across this coil a lamp 70 and a resistor 69. When transistor 68 is conducting, the relay coil is connected from the −20 volt supply through the common (+) terminal of the power supply and is therefore in an energized condition and maintains the closed position of its relay contacts 51 and 52. This condition is indicated by steady energization of lamp 104.

If, however, a faulty command signal is received and transistor 46 is turned on thereby clamping the input to the base of transistor 59 through capacitor 53 and diode 49 to −20 volts, it is obvious that no incoming pulses are present to turn transistor 59 on and thus the capacitor circuit consisting of capacitor 60 and resistor 58 continues to discharge. Depending upon the time constant of this circuit which is previously established to be approximately 1.5 seconds, if no correct pulses are received and therefore transistor 59 remains in an off condition, there will result the eventual non-conductance of transistor 68 and therefore the deenergization of relay 71. When relay 71 deenergizes, the contacts 52 and 51 are opened and the negative clamping voltage is removed from the output of the AND relay driver 18, again permitting the energization of the AND relay 22 and application of new command or reset signals to the system. Reset constitutes dropping all the application relays 30 with the final application of a specified command signal.

With the command relay driver 23 once again permitted to receive new command signals from buffer amplifier 21, the output of the command relay driver 23 will be conducted to the command relays 24 and thence to effect new operation of the vehicle. If, however, the command signals are still improper as previously sensed by the command logic module 28, the command relay 24 and application relay 30 logic will result in an immediate emergency stop being imposed upon the vehicle. This situation will continue as long as there is a failure to receive proper command signals. Normal functioning of the command logic module 28 will only resume upon the condition that proper command signals are received and the essential positive-going pulses from the AND relay driver 18 are conducted through diode 50 to the timing circuitry 95 allowing for reenergization of relay 71. Since diode 49 continually connects capacitor 53 to resistor 48, transistor 46 must be turned off before a positive-going pulse can be attained.

The essential operational details of the command logic module 28 now having been reviewed and presented, it is possible for use to summarize the salient operational features of the invention.

An FM transmitter 7 located with the operator sends randomly spaced multiplex command information for control of a particular remotely located vehicle. The control information consists of address tones establishing or naming the vehicle to be controlled and command tones establishing the operational performance of the vehicle. The FM signal is picked up by any receiving equipment present in the area and located on moving vehicles. The signal is received by an antenna 12, detected by a receiver 13 and amplified. The address tones are conducted to an address tone filter 15 containing tuned circuits for sensing the presence of particular frequency tones. The output of the address tone filter 15 is then conducted to an address code board 16 which code board in conjunction with a similar code plug 8 present in the transmitter system establishes the code identification for the vehicle to be controlled. If the proper address signals are received, they are transmitted through to an address tone detector 17. If not, then the address will fail to establish control over the vehicle. The address tone detector 17 taking or receiving the signals from the address code board 16 rectifies the tone signals and through a transistor switch establishes a signal of either −20 volts or 0 volts. Generation of a −20 volt signal indicates an improper receipt of address signal or a failure of a particular address tone. The output of the address tone detector 17 is then applied to AND relay driver 18 which is an AND gate. The input of this AND gate must receive all positive inputs from the address tone detector 17 if it is to allow a positive voltage output. At the same time, the command tone signals are conducted through to the command tone filter 19 which in similar manner to the address tone filter 15 senses the presence of particular tones by utilizing tuned circuits. The output of this filter is received by the command tone detector 20. The command detector 20 is not capable of being programmed to any particular set of frequencies as is the address detector by the address code board 16 and therefore puts out either a −20 or 0 volt signal depending upon the character of the command received. Both the −20 or the 0 volt signal may indicate a proper command. The output of the command tone detector 20 is conducted to a command buffer amplifier 21 in order to establish a proper output impedance to enable it to drive associated amplifiers and equipment. The output of the command buffer amplifier 21 is then conducted through an AND relay 22 when in its energized condition to a command relay driver 23. The command relay driver 23 output controls the state or condition of the command relays 24. Application relays 30 in turn dictate the actual operational movement of the vehicle. Output of the command tone detector 20 is also conducted to a command logic module 28. The command logic module determines the acceptability or legitimacy of the received command signal. Its output is connected to an AND bus 29 or in other words the input to the AND gate which as previously mentioned is receiving the address tone detector 17 signals. Should the command signals be proper, the AND bus 29 is allowed to go from minus to positive upon the receipt of address pulses. If, however, as previously described, the command logic senses an improper signal, it clamps the AND bus 29 to a minus voltage. This clamping results in a deenergization of the AND relay 22 and the removing of command signals from the command relays 24. Due to the time constant or release time of the command relay driver 23, the system will continue to operate upon its last received command signal for a period of over 5 seconds if no other command or shutoff signal is received.

The timing circuitry 95 of the command logic module 28 senses the clamping of the AND bus to minus and if such command logic clamping maintains itself for longer than 1.5 seconds, it will result in the command logic timer opening a relay and removing the command logic module 28 from the AND bus 29 thereby re-establishing the connection from the command signals through to the command relays 24. If the command signals at this point are still improper, the command 24 and application relay 30 logic will result in an immediate shutdown of the system. If the command signals are now proper, then the system will return to its normal functioning mode. Thus, a 1.5 second interval is established delaying emergency shutdown due to the receipt of improper command signals. The output of the AND bus 29 is also conducted to a pulse ON-pulse OFF safety unit 26. The pulse ON-pulse OFF safety unit 26 controls related relays. The presence of a positive-going pulse from the AND relay driver 18 maintains a pulse ON relay in a closed position; while the failure to receive a positive-going pulse will cause the pulse OFF network to deenergize a pulse OFF relay. These safety networks thus present a fail-safe aspect to the system upon its failure to receive proper address signals. Should an address signal failure take place, the AND bus 29 will fail to produce a positive-going signal and the time constant of the pulse ON-pulse OFF safety system is such that after a 5 second interval of continued address failure the command relays 24 will be forced into an emergency stop position.

A system is thus provided for the control of a remote vehicle whereby a continued failure in the transmission or receipt of command signals will result in a 3 second shutdown; while a continued failure in the transmission or receipt of address signals will result in a 5 second interval shutdown. The safety features of the system are maintained in that hazardous operation is prevented, at the same time the intolerability of numerous system shutdowns is obviated upon the momentary failure of command signals.

What I claim is:

1. A communication system for controlling a remotely located device comprising;

1. a transmitter for sending time spaced signal pulses containing address and command instructions;
2. a receiver on the device responsive to the signal pulses adapted to provide a composite signal containing both the address and command instruction signals;
3. circuit means for detecting and determining the propriety of the command and address instruction signals from the composite signal, including a first timing circuit adapted to cause the circuit means to produce an output signal indicative of apparent proper command instruction signals after improper command instruction signals have been continuously received for a first predetermined interval encompassing more than a single signal pulse transmission;
4. gating means controlled by the circuit means for conducting the command instruction signals when the detection circuit indicates both proper command and address instructions;
5. a second timing circuit adapted to produce a predetermined command instruction after improper address instruction signals have been continuously received by the circuit means for a second predetermined interval longer than the first predetermined interval; and
6. application means responsive to the command instructions conducted by the gate circuit and produced by the second timing circuit for controlling the remotely located device in the desired manner.

2. The system of claim 1 wherein the signal pulses comprise a radio carrier frequency wave modulated by address and command instruction signals.

3. The system of claim 2 wherein the address and command instruction signals take the form of a group of modulating frequencies.

4. The system of claim 3 wherein the carrier frequency wave is frequency modulated by the address and command instruction signals which are in the form of a distinctive group of modulating frequencies.

5. The system of claim 4 wherein the circuit means includes filters for recovering the command instruction signals from the composite signal, a circuit for detecting the command instruction signals, and a logic circuit responsive to the detected signals adapted to produce an output signal indicative of improper command instruction signals.

6. The system of claim 5 wherein the first timing circuit comprises, an impedance network having a desired discharge time constant, the network being charged by correct detected address instruction signals except when improper command instruction signals are received which cause the network to discharge, a switching circuit sensitive to the voltage level on the network for effecting an indication of apparent proper command instruction signals from the circuit means whenever improper command instruction signals have been continuously detected for the first predetermined interval sufficient to discharge the voltage level on the network below a selected value thereby actuating the switching circuit.

7. The system of claim 6 wherein the first timing circuit comprises a resistor capacitor network having a desired discharge time constant, the network being charged by correct detected address instruction signals except when the logic circuit produces an output signal indicative of an improper command instruction which logic output signal clamps the circuit means output signal and the input to the network to a potential value causing the network to discharge, a transistor switching circuit responsive to the voltage level on the network which changes output conductance state whenever the voltage level falls below a selected value, and a relay controlled by the change of conductance in the transistor switching circuit to remove the logic output signal from the circuit means output signal thereby indicating apparent proper command instruction signals.

8. The system of claim 6 in which the command instruction signals comprise a group of modulating frequencies representing a complete instruction word, each digit of the instruction word being indicated by one of two possible frequencies, wherein the logic circuit comprises a resistor summing network having inputs from the filters associated with each possible frequency representing an instruction digit, a bridge circuit responsive to the summing network adapted to produce an output signal indicative of the propriety of the command digit, and a transistor switching circuit responsive to the bridge output for producing a particular output voltage indicative of an improper command instruction whenever the bridge circuit output signal indicates an improper command digit.

9. The system of claim 8 wherein the bridge circuit comprises a diode-resistor network having the output taken across the junctions of the diode and resistor pairs, the input connected to the junction of the diodes and a reference potential connected to the junction of the resistors.

10. The system of claim 8 wherein the application circuit is programmed to produce a shutdown stop of the device whenever an improper command instruction signal is conducted to the application circuit or whenever the second timing circuit produces the predetermined command instruction.

11. The system of claim 10 wherein the application circuit comprises relays for initiating commands to the functional controls of the device.

12. A receiver for producing command instruction signals to control a device in accordance with transmitted signal pulses containing address and command instructions comprising:

1. reception circuitry on the device responsive to the transmitted signal pulses adapted to generating a composite signal containing both the command and address instruction signals;
2. circuit means for detecting and determining the propriety of the command and address instruction signals from the composite signal, including a first timing circuit adapted to cause the circuit means to produce an output signal indicative of apparent proper command instruction signals after improper command instruction signals have been continuously received for a first predetermined interval encompassing more than a single signal pulse transmission;

3. a second timing circuit adapted to produce a predetermined command instruction after improper address instruction signals have been received by the circuit means for a second predetermined interval longer than the first predetermined interval; and 4. a gating means controlled by the circuit means for conducting the command instruction when the detection circuit indicates both proper command and address instructions.

13. The radio receiver of claim 12 wherein the transmitted signal pulses comprise a carrier frequency which is frequency modulated by address and/or command instruction signals which are in the form of a distinctive group of modulating frequencies.

14. The receiver of claim 13 wherein the circuit means includes filters for recovering the command instruction signals from the composite signal, a circuit for detecting the command instruction signals, and a logic circuit responsive to the detected signals adapted to produce an output signal indicative of improper command instruction signals.

15. The receiver of claim 14 wherein the first timing circuit comprises, a resistor capacitor network having a desired discharge time constant, the network being charged by correct detected address instruction signals except when the logic circuit produces an output signal indicative of an improper command instruction, which logic output signal clamps the circuit means output signal and the input to the network to a potential value causing the network to discharge, a transistor switching circuit responsive to the voltage level on the network which changes output conductance state whenever the voltage level falls below a selected value, and a relay controlled by the change of conductance in the transistor switching circuit to remove the logic output signal from the circuit means output signal thereby indicating apparent proper command instruction signals.

16. The receiver of claim 15 in which the command instruction signals comprise a group of modulating frequencies representing a complete instruction word, each digit of the instruction word being indicated by one of two possible frequencies, wherein the logic circuit comprises a resistor summing network having inputs from the filters associated with each possible frequency representing an instruction digit, a bridge circuit responsive to the summing network adapted to produce an output signal indicative of the propriety of the command digit, and a transistor switching circuit responsive to the bridge output for producing a particular output voltage indicative of an improper command instruction whenever the bridge circuit output signal indicates an improper command digit.

17. A method for imposing command instructions on a remotely located device wherein radio signal pulses containing address and command instruction signals are transmitted to a receiver on the device, comprising the steps of:

1. receiving the radio signal pulses,
2. producing a composite signal containing both the address and command instruction signals,
3. separating the composite signal into command and address instruction signals, detecting each such signal, and
4. checking the propriety of the instruction signals, and if both are proper operating the vehicle in accordance with the command instructions,
5. upon receipt of improper instruction signals preventing any new command instruction from operating the device,
6. upon improper command instruction signals continuously persisting for longer than a first predetermined interval allowing new command instructions to operate the device provided the address instruction signals are proper, and
7. upon receipt of improper address instruction signals persisting for longer than a second predetermined interval greater than the first predetermined interval then imposing a selected command on the device.

* * * * *